May 3, 1932.  G. A. MONTELIUS  1,856,779
MEASURING INSTRUMENT
Filed Nov. 12, 1928   3 Sheets-Sheet 1
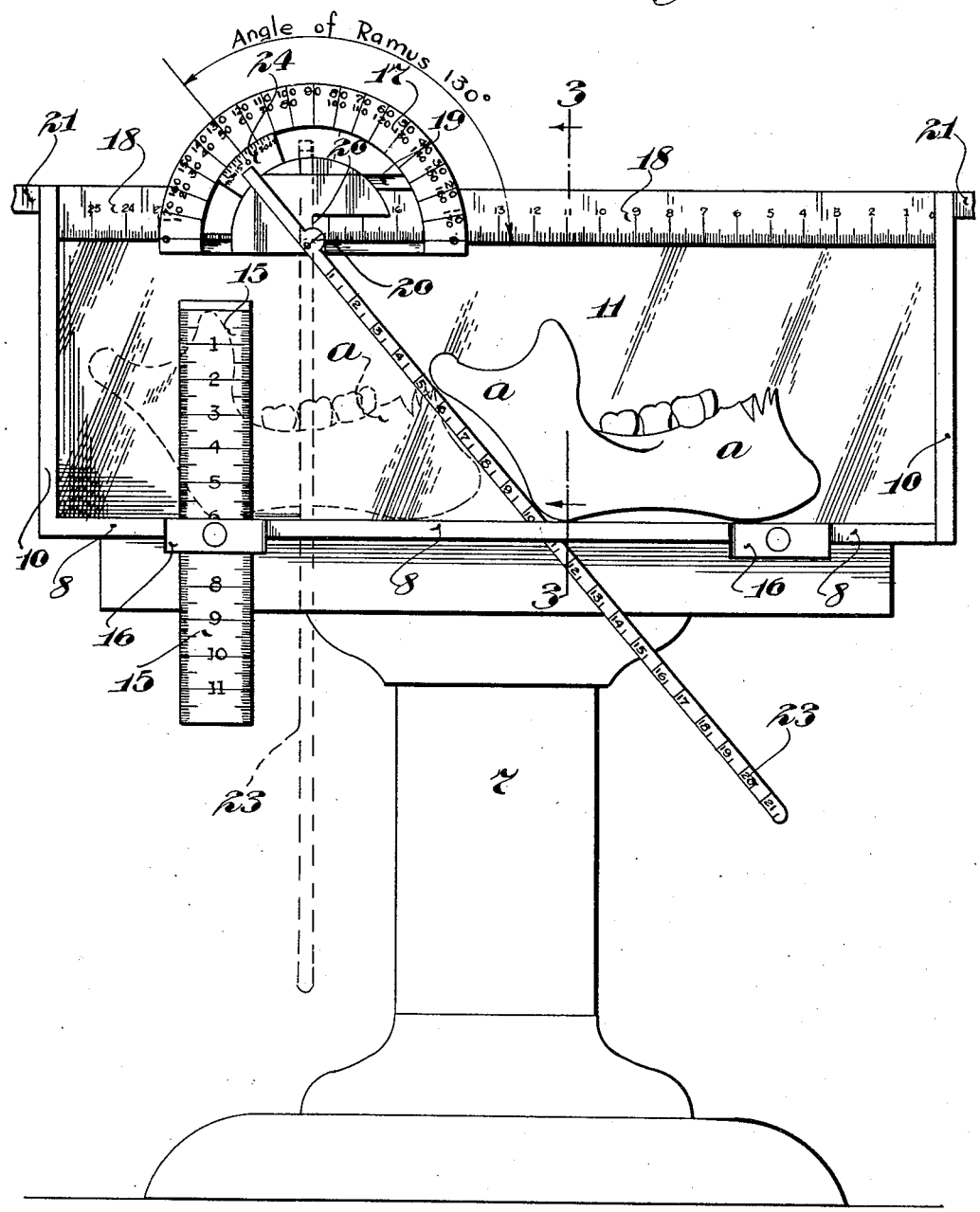
Inventor
George A. Montelius
By his Attorneys
Merchant and Kilgore May 3, 1932.　　　G. A. MONTELIUS　　　1,856,779
MEASURING INSTRUMENT
Filed Nov. 12, 1928　　　3 Sheets-Sheet 2
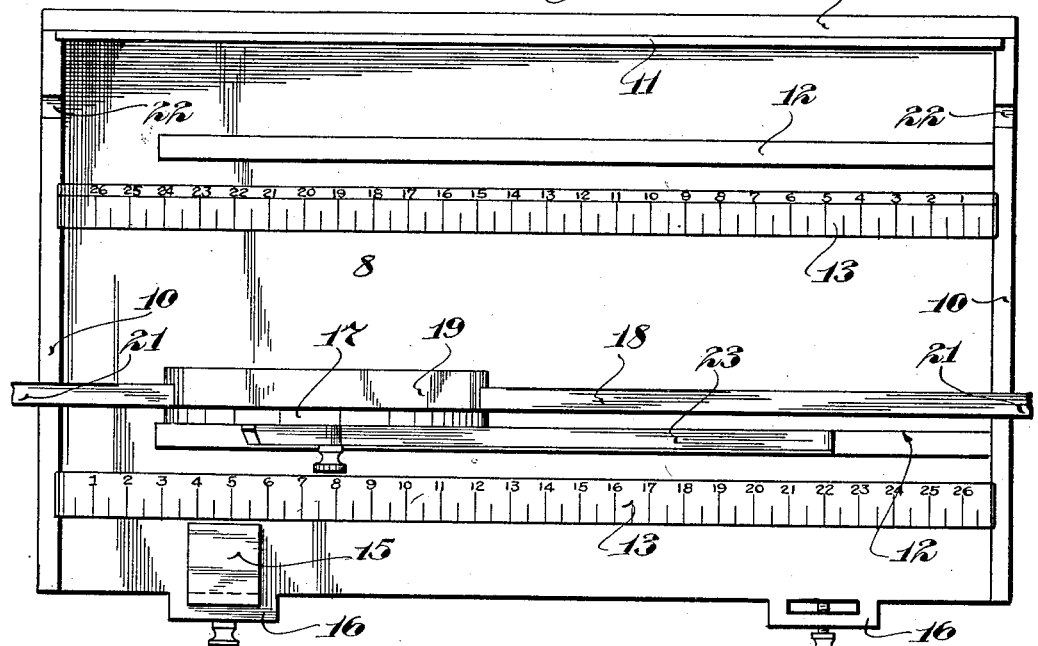
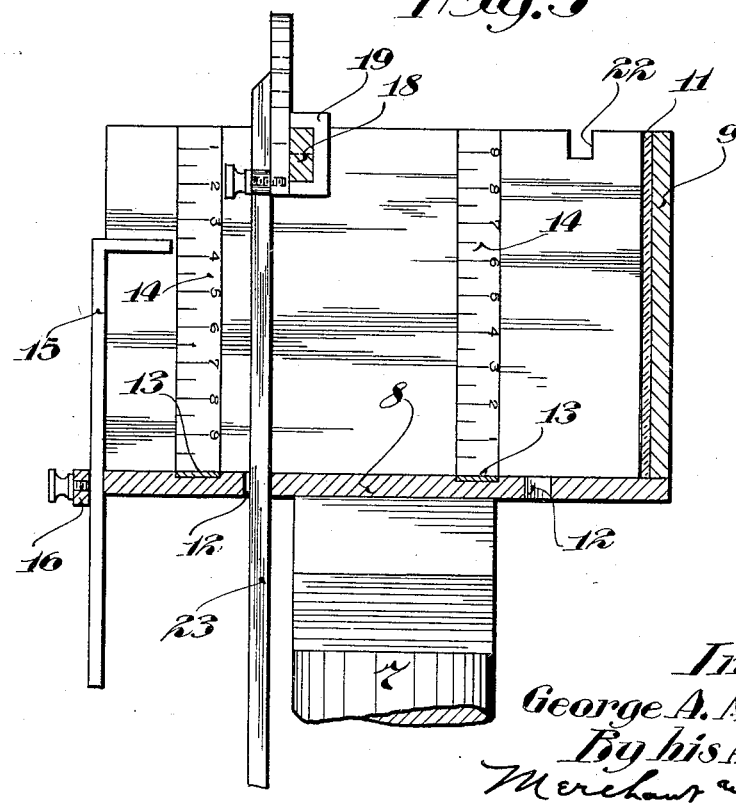
Inventor
George A. Montelius
By his Attorneys
Merchant and Kilgore May 3, 1932. G. A. MONTELIUS 1,856,779
MEASURING INSTRUMENT
Filed Nov. 12, 1928 3 Sheets-Sheet 3
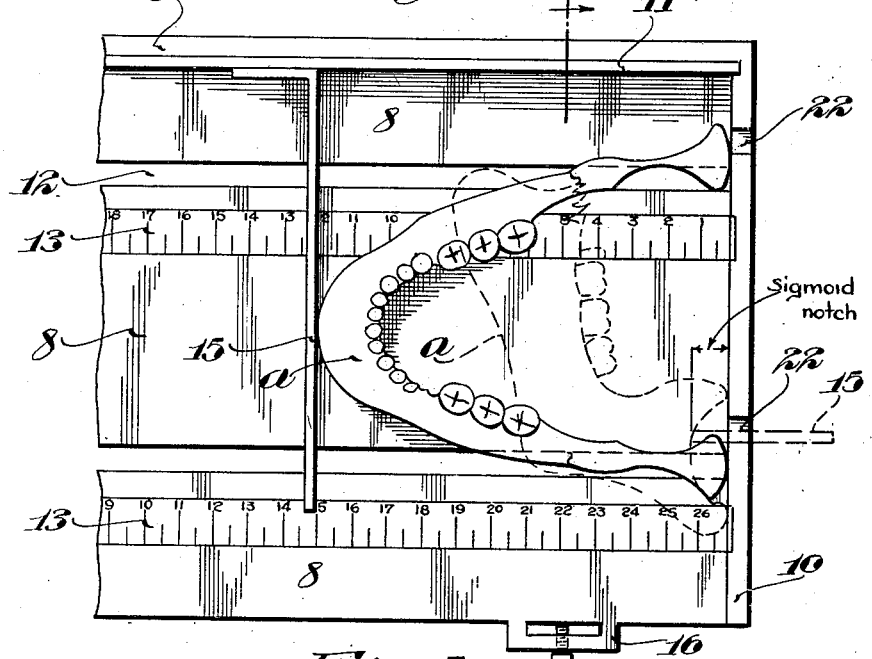
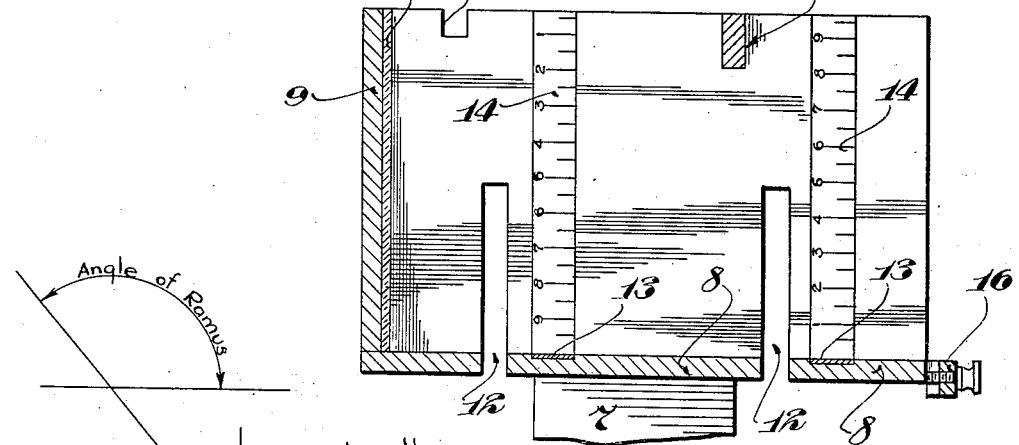
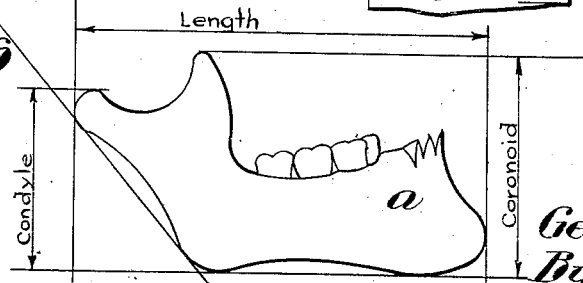
Inventor
George A. Montelius
By his Attorneys
Merchant & Keon Patented May 3, 1932

1,856,779

UNITED STATES PATENT OFFICE

GEORGE A. MONTELIUS, OF MINNEAPOLIS, MINNESOTA

MEASURING INSTRUMENT

Application filed November 12, 1928. Serial No. 318,937.

My invention has for its object the provision of a mandibular-ramus instrument, the purposes of which are to obtain and establish, easily, accurately and swiftly, the principal measurements of the mendible, human or anthropoid. The instrument is the result of a large amount of practical work done in research on skelletal material of the American Indian in connection with working upon the problem of the evolution of human dentition and its correlation to structure and function and also in comparative measurements of Arikara and Hopi skulls, with special reference to dentition and related problems.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the improved instrument indicating by means of full lines a lower jaw bone resting on the base member with the protractor arm adjusted to measure the angle of ramus and further illustrating, by means of broken lines, the protractor arm in a vertical position and the lower jaw bone positioned under the sliding scale to measure the height;

Fig. 2 is a plan view of the instrument;

Fig. 3 is a transverse vertical section taken on the line 3—3 of Fig. 1;

Fig. 4 is a fragmentary plan view showing the instrument adjusted to measure the length of the lower jaw bone and further indicating, by means of broken lines, the method of measuring the sigmoid notch in the lower jaw bone;

Fig. 5 is a transverse vertical section taken on the line 5—5 of Fig. 4; and

Fig. 6 is a view in diagram illustrating the lower jaw bone and the principal measurements to be taken thereon by the instrument.

The instrument, as shown, is mounted on a pedestal 7 and includes a box-like structure comprising a horizontal rectangular base or bottom member 8 secured to said pedestal, a vertical back member 9 and two parallel vertical end members 10 that extend at right angles to said back member. This back member 9 is provided at its inner face with a reflecting surface 11 in the form of a mirror seated at its ends in grooves in the end members 10.

Formed in the base member 8 are two longitudinally extended slots or passageways 12 which extend parallel to each other and the back member 9. These passageways 12 at their left hand ends terminate short of the adjacent end member 10 and their other ends extend to the right hand member 10 and for a considerable distance upward therein, as shown in Fig. 5.

Inlaid in the base member 8 and extending adjacent to each passageway 12 is a scale 13 which extends the full distance between the end members 10. In the inner face of each end member 10 are inlaid two parallel scales 14 aligned with the scales 13. The zero point of the inner scale 13 is at the right end member 10 and the two scales 14 the one at the right-hand end thereof reads downward and the other reads upward, see Figs. 3 and 5. The zero point for the outer scale 13 is at the inner face of the left hand end member 10 and the two scales 14 the one at the right-hand end thereof reads upward and the other downward.

A shiftable square 15 is provided for cooperation with either one of the scales 13 in determining the length of an object resting on the base member 8 and engaging one of the end members 10 as a zero point. This square 15 has a short flat leg adapted to be held against the mirror 11 to position the long leg of said square at right angles thereto and intersecting the two scales 13, as shown in Fig. 4.

The square 15 is further adapted for use in measuring the height of an object resting on the base member 8. When the square is thus used its long leg is mounted in either one of the two keepers 16 on the outer edge portion of the base member 8 for vertical adjustment with the short horizontal end of said square overlying the base member 8 and extending parallel thereto, see Figs. 1, 2 and 3. Each keeper 16 is provided with a set screw arranged to impinge against the long leg of the square 15 and hold said square with its short leg positioned over the base member 8. The zero point on the square 15 is at the inner face of the short leg of said square and reads toward the outer end of the long leg thereof.

The square 15 may also be used to take various different measurements of an object on the base member 8 such as the depth, recess, cavity or the like. When the square 15 is thus used the end portion of its long leg is inserted through one of the upright extensions of one of the passageways 12 and the inner face of the right hand end member 10 used as a reading surface. In taking such a measurement the object is placed on the base 8 and positioned against the right hand end member 10, as shown by broken lines in Fig. 4.

The improved instrument also includes a protractor 17 in the form of a semi-circle slidably mounted on a horizontal guide rail 18 vertically spaced above the base member 8 with its lower longitudinal edge portion parallel to the base member. This protractor 17 is graduated into two scales of 180° each and reads in opposite directions. The zero points of the two scales on the protractor 17 are on a line that is coincident with the lower edge portion of the guide rail 18 and that intersects the axis of the protractor 17 and parallel to the base member 8. Said protractor 17 has on its back a box-like member 19 through which the guide rail 17 projects and supports said protractor to sliding movement longitudinally on said rail.

The guide rail 18 is provided with a scale 18 the zero point of which is at the inner face of the right hand end member 10. The protractor 17 is provided with a reading edge 20 which extends transversely of the guide rail 18 that intersects the axis of the protractor for cooperation with the scale on said guide rail to position the protractor predetermined distances from the inner face of the right hand end member 10.

The guide rail 18 is detachably secured to the end members 8 for lateral adjustment into two different positions in which it substantially overlies the passageways 12. As one means of detachably supporting the guide rail 18, the same is provided with reduced end extensions 21 which removably rest in open notch-like seats 22 formed in the upper edge portions of the end members 10. The ends of the guide rail 18 below their extensions 21 engage the inner faces of the end members 10 and afford convenient means by which the guide rail 18 may be handled to position its end extensions 21 in either pair of seats 22 or remove the same therefrom.

A swingable arm 23 is pivoted to the protractor 17 at the axis thereof with one of its longitudinal edge portions intersecting said axis, and this edge portion of said arm is graduated to form a scale the zero point of which is at the axis of the protractor 17. The free end portion of the protractor arm 23 extends through one of the passageways 12 with freedom for swinging movement depending on which pair of seats 22 the guide rail 18 is mounted in. On the inner end of the protractor arm 23 is a vernier 24 the graduations of which indicate minutes arranged for cooperation with the scales on the protractor 17. The scales 13 and 14 as well as the scales on the square 15, guide rail 18 and protractor arm 23 represent centimeters.

As heretofore stated, the improved measuring instrument is especially well adapted for taking certain measurements of a lower jaw bone indicated in the drawings by A. To obtain the length of the jaw bone A the same together with the square 15 are positioned, as indicated by full lines in Fig. 4, and the reading taken on the inner scale 13 at the point where the face of said scale that engages the jaw bone A intersects said scale 13.

To measure the depth of one of the sigmoid notches the jaw bone A and square 15 are positioned, as shown by broken lines in Fig. 4. In taking this measurement the long leg of the square 15 is inserted through the upright extension of the foremost passageway 12 and the reading taken on the square at the inner face of the respective end member 10. To take a coronoid measurement, as illustrated in Fig. 6, the jaw bone A is positioned on the base member 8, as shown by broken lines in Fig. 1 and the square 15 positioned, as indicated by full lines in said Fig. 1 and reading taken thereon at the surface of the base member 8 on which the jaw bone A rests.

The condyle measurement, as indicated in Fig. 6, may be taken in a similar manner as that of the coronoid, simply by shifting the jaw bone A on the base member 8 to properly position the same in respect to the short leg of the square 15. Fig. 1 shows the protractor 17 and its arm 23 adjusted to measure the angle of ramus, as indicated in Fig. 6.

The above examples are only a few of the many ways that measurements may be very quickly and easily taken with the improved instrument. For instance, the arm 23 may be set at 90° on the protractor 17 to bring said arm into a perpendicular position in respect to the base member 8 and the length of an object on said base member engaging one of the end members 8 may be taken on either one of the scales 13 or on the scale of the guide rail 18.

What I claim is:

1. An instrument of the class described comprising a base member having a passageway, and a protractor the zero point of which is on a radial line that is parallel to the base member, said protractor having a swingable arm extending through said passageway and arranged for cooperation with the base member and the protractor for measuring the angle of an object on the base member.

2. An instrument of the class described comprising a base member having a supporting surface, a relatively fixed guide rail parallel to the base member, and a protractor slidably mounted on the guide rail and having a swingable arm intersecting the supporting surface for cooperation therewith and the protractor for measuring the angle of an object on the base member.

3. An instrument of the class described comprising a horizontal base member having a supporting surface, two fixed vertical end members, a guide rail mounted on the end members and extending parallel to the base member, a protractor slidably mounted on the guide rail and having a swingable arm intersecting the supporting surface for cooperation therewith and the protractor for measuring the angle of an object on the base member.

4. The structure defined in claim 3 in which the guide rail is positively held against endwise movement in respect to the end members and provided with a scale for positioning the protractor thereon in respect to one of the end members.

5. An instrument of the class described comprising a horizontal base member, a vertical back member, two vertical end members, a scale on the base member reading from one of the end members, and a square arranged to be positioned with one of its legs on the back member and its other leg intersecting the scale on the base member.

6. An instrument of the class described comprising a horizontal base member, a vertical back member, two vertical end members, two scales on the base member reading one from each end member, and a square one leg of which is arranged to be positioned on the back member and its other leg intersecting the two scales.

7. An instrument of the class described comprising a horizontal base member, two vertical end members, a scale on the base member reading from one of the end members, a scale on one of the end members, and a movable square having a swingable blade intersecting the base member for cooperation with the scale thereon.

8. An instrument of the class described comprising a horizontal base member, two vertical end members, two scales on the base member reading one from each of the end members, two scales on one of the end members and reading one from the base member and the other toward the same, and a movable square cooperating with the scales on the base member.

9. An instrument of the class described comprising a horizontal base member, a vertical end member having a scale passageway, and a scale insertable through said passageway for contact with an object on the base member and engaging the end member, said scale being readable at the end member.

10. An instrument of the class described comprising a horizontal base member, a vertical back member, two vertical end members, a scale on the base member reading from one of the end members, a guide rail on the end members extending parallel to the base member, and a protractor slidably mounted on the guide rail and having a swingable arm cooperating with the base member and protractor to measure the angle of an object on the base member.

11. An instrument of the class described comprising a horizontal base member, a vertical back member, two vertical end members, there being a pair of laterally spaced longitudinally extended passageways in the base member, two scales on the base member one for each of the passageways and reading one from each end member, a guide rail mounted on the end members and extending parallel to the base member, a protractor slidably mounted on the guide rail and having a swingable arm, said guide rail being free for lateral adjustment on the end members to position the protractor with its arm extending through either one of the passageways for cooperation with the base member and protractor for measuring the angle of an object on the base member.

12. The structure defined in claim 11 in which the end members are provided with scales that extend from the scales on the base member, the two scales on each end member reading the one from the base member and the other toward the same.

13. The structure defined in claim 11 in which the passageways extend upward into one of the end members, and in which the end members are provided with scales that extend from the scales on the base member, the two scales on each end member reading the one from the base member and the other toward the same.

14. An instrument of the class described, comprising a base member having a supporting surface, and a protractor slidably mounted for movement parallel to the base member and having a swingable arm intersecting the supporting surface for cooperation therewith and the protractor for measuring the angle of an object on the base member.

15. An instrument of the class described, comprising a base member, a flat back member perpendicular to the base member and having on its inner face a reflecting surface, and an adjustable angle measuring device in front of the reflecting surface for measuring the angle of an object on the base member.

In testimony whereof I affix my signature.

GEORGE A. MONTELIUS.